United States Patent
Kuzma et al.

(10) Patent No.: US 7,113,095 B2
(45) Date of Patent: Sep. 26, 2006

(54) TRACKABLE FILES AND SYSTEMS FOR USING THE SAME

(75) Inventors: Peter J. Kuzma, Richboro, PA (US); Alan Green, Greenwood, SC (US)

(73) Assignee: Avery Dennison Corp., Pasadena, CA (US)

( * ) Notice: Subject to any disclaimer, the term of this patent is extended or adjusted under 35 U.S.C. 154(b) by 567 days.

(21) Appl. No.: 09/863,752

(22) Filed: May 22, 2001

(65) Prior Publication Data

US 2002/0041234 A1   Apr. 11, 2002

(51) Int. Cl.
   *G08B 13/14*   (2006.01)
(52) U.S. Cl. ............... 340/572.7; 340/572.8; 340/825.49; 235/385; 235/492
(58) Field of Classification Search ............. 340/568.1, 340/572.1, 571, 825.49, 825.36, 825.58; 235/392, 385; 705/28
   See application file for complete search history.

(56) References Cited

U.S. PATENT DOCUMENTS

| | | | |
|---|---|---|---|
| 3,810,147 A | | 5/1974 | Lichtblau .................. 340/572.3 |
| 4,063,229 A | * | 12/1977 | Welsh et al. ................. 340/571 |
| 4,129,855 A | | 12/1978 | Rodrian ...................... 340/5.65 |
| 4,201,960 A | | 5/1980 | Skutta et al. ............... 333/17.3 |
| 4,486,722 A | | 12/1984 | Landt ......................... 333/17.3 |
| 4,799,066 A | | 1/1989 | Deacon ....................... 343/861 |
| 4,910,499 A | | 3/1990 | Benge et al. ............. 340/572.3 |
| 5,051,741 A | | 9/1991 | Wesby .................... 340/825.49 |
| 5,119,070 A | | 6/1992 | Matsumoto et al. ..... 340/572.5 |
| 5,260,690 A | * | 11/1993 | Mann et al. ............. 340/572.2 |
| 5,348,008 A | | 9/1994 | Bornn et al. ................. 600/301 |

(Continued)

FOREIGN PATENT DOCUMENTS

DE   19812883 A1   10/1999

(Continued)

OTHER PUBLICATIONS

Hilmar Schmund, "Tracing Paper—with Lasers," Wired, Feb. 2000, p. 68.

(Continued)

*Primary Examiner*—Benjamin C. Lee
(74) *Attorney, Agent, or Firm*—Tarolli, Sundheim, Covell & Tummino LLP

(57) ABSTRACT

A system for tracking files at a site having a plurality of locations includes a plurality of antenna arrays and a plurality of files. Each of the antenna arrays generates an energizing field and is disposed at or near one of the locations. Each of the files includes a body including a pair of covers and a transponder assembly. The transponder assembly may include a substrate, an antenna disposed on one of the sides of the substrate, a circuit coupled to the antenna and having an identifier code, and an adhesive layer disposed on the other side of the substrate. The transponder assembly may be attached to one of the covers by the adhesive. The identifier code is unique for each of the files. In operation, each of the transponder assemblies is activated by the energizing field of one of the antenna arrays when moved within an operative distance thereof. An activated transponder assembly responsively transmits a signal indicative of the identifier code. A reader in communication with the antenna arrays receives the signal from the activated transponder assembly. An administrator may be provided in communication with the reader for receiving information from the reader indicative of the location of the file associated with the transponder assembly transmitting the signal. Accordingly, each of the files of the system may be tracked as the files are moved throughout a site.

5 Claims, 9 Drawing Sheets

U.S. PATENT DOCUMENTS

| | | | |
|---|---|---|---|
| 5,349,332 A | 9/1994 | Ferguson et al. | 340/572.2 |
| 5,367,290 A | 11/1994 | Kind et al. | 340/572.3 |
| 5,381,137 A | 1/1995 | Ghaem et al. | 340/572.5 |
| 5,424,858 A | 6/1995 | Gillotte | 398/108 |
| 5,446,447 A | 8/1995 | Carney et al. | 340/572.4 |
| 5,473,330 A | 12/1995 | Lauro et al. | 342/42 |
| 5,528,222 A | 6/1996 | Moskowitz et al. | 340/572.7 |
| 5,604,485 A | 2/1997 | Lauro et al. | 340/572.5 |
| 5,640,002 A | 6/1997 | Rupert et al. | 235/462.46 |
| 5,652,043 A | 7/1997 | Nitzan | 428/209 |
| 5,661,457 A | 8/1997 | Ghaffari et al. | 340/572.7 |
| 5,682,143 A | 10/1997 | Brady et al. | 340/572.7 |
| 5,686,902 A | 11/1997 | Reis et al. | 340/10.2 |
| 5,708,423 A | 1/1998 | Ghaffari et al. | 340/5.8 |
| 5,726,630 A | 3/1998 | Marsh et al. | 340/10.2 |
| 5,751,221 A | 5/1998 | Stanfield et al. | 340/5.74 |
| 5,811,204 A | 9/1998 | Nitzan | 429/127 |
| 5,859,587 A | 1/1999 | Alicot et al. | 340/572.8 |
| 5,894,268 A * | 4/1999 | McLaren | 340/572.8 |
| 5,897,522 A | 4/1999 | Nitzan | 604/20 |
| 5,936,527 A | 8/1999 | Isaacman et al. | 340/572.1 |
| 5,977,875 A | 11/1999 | Lin et al. | 340/570 |
| 6,002,344 A | 12/1999 | Bandy et al. | 340/10.2 |
| 6,019,865 A | 2/2000 | Palmer et al. | 156/265 |
| 6,040,773 A | 3/2000 | Vega et al. | 340/572.1 |
| 6,045,652 A * | 4/2000 | Tuttle et al. | 156/292 |
| 6,104,311 A | 8/2000 | Lastinger | 340/10.51 |
| 6,121,880 A * | 9/2000 | Scott et al. | 340/572.5 |
| 6,154,137 A | 11/2000 | Goff et al. | 340/572.4 |
| 6,201,474 B1 * | 3/2001 | Brady et al. | 340/572.8 |
| 6,203,952 B1 | 3/2001 | O'Brien et al. | 430/17 |
| 6,204,764 B1 * | 3/2001 | Maloney | 340/568.1 |
| 6,232,870 B1 | 5/2001 | Garber et al. | 340/10.1 |
| 6,255,951 B1 * | 7/2001 | De La Huerga | 340/573.1 |
| 6,259,369 B1 * | 7/2001 | Monico | 340/572.8 |
| 6,260,049 B1 * | 7/2001 | Fitzgerald et al. | 707/104.1 |
| 6,281,795 B1 * | 8/2001 | Smith et al. | 340/572.1 |
| 6,335,686 B1 | 1/2002 | Goff et al. | 340/572.4 |
| 6,340,932 B1 | 1/2002 | Rodgers et al. | 340/572.7 |
| 6,351,215 B1 | 2/2002 | Rodgers et al. | 340/572.1 |
| 6,362,737 B1 | 3/2002 | Rodgers et al. | 340/572.1 |
| 6,377,203 B1 | 4/2002 | Doany | 342/44 |
| 6,399,258 B1 | 6/2002 | O'Brien et al. | 430/17 |
| 6,407,669 B1 | 6/2002 | Brown et al. | 340/572.1 |
| 6,424,262 B1 | 7/2002 | Garber et al. | 340/572.3 |
| 6,448,886 B1 | 9/2002 | Garber et al. | 340/10.1 |
| 6,486,780 B1 | 11/2002 | Garber et al. | 340/572.1 |
| 6,546,982 B1 * | 4/2003 | Brown et al. | 152/152.1 |
| 6,552,661 B1 | 4/2003 | Lastinger et al. | 340/572.1 |
| 2001/0006766 A1 | 7/2001 | O'Brien et al. | 430/325 |
| 2001/0008390 A1 | 7/2001 | Berquist et al. | 340/10.31 |
| 2002/0008623 A1 | 1/2002 | Garber et al. | 340/572.1 |
| 2002/0011967 A1 | 1/2002 | Goff et al. | 343/895 |
| 2002/0070862 A1 | 6/2002 | Francis et al. | 340/572.1 |
| 2002/0113707 A1 | 8/2002 | Grunes et al. | 340/572.1 |
| 2002/0167406 A1 | 11/2002 | Garber et al. | 340/572.7 |
| 2002/0185532 A1 | 12/2002 | Berquist et al. | 235/385 |
| 2002/0190862 A1 | 12/2002 | Berquist et al. | 340/572.1 |
| 2002/0194208 A1 | 12/2002 | Knoll et al. | 707/204 |
| 2002/0196126 A1 | 12/2002 | Eisenberg et al. | 340/10.2 |
| 2003/0016133 A1 | 1/2003 | Egbert | 340/572.7 |
| 2003/0069815 A1 | 4/2003 | Eisenberg et al. | 705/32 |
| 2003/0089771 A1 | 5/2003 | Cybulski et al. | 235/385 |
| 2003/0111542 A1 | 6/2003 | Look | 235/494 |

FOREIGN PATENT DOCUMENTS

| | | |
|---|---|---|
| EP | 0640939 A2 | 3/1995 |
| WO | WO 9701154 | 1/1997 |
| WO | WO 9816070 | 4/1998 |
| WO | WO/00/10122 | 2/2000 |
| WO | WO/01/57807 | 8/2001 |
| WO | WO/02/073512 | 9/2002 |
| WO | WO/02/099715 | 12/2002 |
| WO | WO/02/099730 | 12/2002 |

OTHER PUBLICATIONS www.barcodedata.com.au/percon/barcode.htm, "All about Bar Codes," Mar. 2, 2000, p. 1-6.

www.aimusa.org/technologies...rces/dcstudy/datacarrier_study.htm, "A Study of Data Carrier Issues for the Next Generation of Integrated AIDC Technology," Mar. 2, 2000, p. 1-30.

www.aimusa,org/technologies.rfid/common_applications_rfid.asp, "Common Applications RFID," Mar. 2, 2000, p. 1-2.

www.aimusa.org/technologies/rfid/what_is_rfid.htm, "What is Radio Frequency Identification (RFID)?" Mar. 2, 2000, p. 1-2.

www.aimusa.org/technologies...rces/papers/rfid_basics_primer.htm, "Radio Frequency Identification—RFID," Mar. 2, 2000, p. 1-12.

www.thax.de/english/programm/findentity.html, "Findentity," Mar. 21, 2000, p. 1-4.

www.thax.de/english/programm/findentity_activex.html, Mar. 21, 2000, p. 1-2.

www.thax.de/english/thax/thax.html, Mar. 21, 2000, p. 1.

www.thax.de/presse/eureka_999.htm, Mar. 21, 2000, p. 1-2.

www.thax.de/presse/wired_0200.html, Mar. 21, 2000, p. 1.

www.thax.de/presse/id_news_230299.html, Mar. 21, 2000, p. 1.

www.thax.de/presse/cebitnews_210399.html, Mar. 21, 2000, p. 1.

www.thax.de/presse/plus_0799_engl.html, Mar. 21, 2000, p. 1.

www.rapidttp.co.za/transponder/rfsupp59.html, "Transponder News," Mar. 21, 2000, p. 1.

www.gemplus.com/about/pressroom/press/tag/2000/checkpoint_uk.htm, "Press Release," Mar. 21, 2000, p. 1-3.

www.gemplus.com/app/smart_tracking/index.htm, "Smart Asset Tracking," Mar. 21, 2000, p. 1.

www.gemplus.com/app/smart_tracking/introduction.htm, "Introduction to Asset Tracking," Mar. 21, 200, p. 1-3.

www.gemplus.com/products/tag/gw_smart_labels.htm, "GemWave Smart Labels," Mar. 21, 2000, p. 1-2.

www.gemplus.com/products/tag/gw_folio70.htm, "GemWave Logistics Smart Label," Mar. 21, 2000, p. 1-2.

www.gemplus.com/products/tag/gemfly.htm, "GemFly," Mar. 21, 2000, p. 1-2.

http://rapidttp.co.za/transponder/editori3.html, "Transponder News—Editorial," May 5, 2000, p. 1-2.

http://rapidttp.com/transponder/newswork.html, "Transponder News—How RFID systems work," May 5, 2000, p. 1-2.

http://rapidttp.com/transponder.newswrk1.html, "Transponder News—How it works (Part 2)," May 5, 2000, p. 1-2.

http://rapidttp.com/transponder/taglayer.html, "Transponder News—Designing RFID systems," May 5, 2000, p. 1-5.

http://rapidttp.com/transponder, "Transponder News," May 9, 2000, p. 1-3.

http://rapidttp.com/transponder/freqpwr.html, "Transponder News—Range versus power and frequency for passive electric coupled tags," May 22, 2000, p. 1-5.

http://rapidttp.com/transponder/trolposs.html, "Transponder News—'Is it possible to scan a supermarket trolley using RFID?'" May 22, 2000, p. 1-6.

Press Release: "High Performance, Open Standard for Low-cost Tagging Applications," Microchip Technology, Inc., Feb. 1, 1999.

* cited by examiner

TRACKABLE FILES AND SYSTEMS FOR USING THE SAME

BACKGROUND OF THE INVENTION

1. Field of the Invention

The present invention relates radio-frequency identification (RFID) systems, particularly such systems configured to track objects. The present invention also related to files, such as file folders for use in retaining documents. The present invention also relates to methods and apparatus for managing files in a document-management system. The files of the present invention include an RFID transponder that enables the files to be tracked and managed across an installation site such as a courthouse or an office building.

2. Description of the Related Art

The field of radio-frequency identification (RFID) includes a wide variety of technologies for various applications. For example, RFID may be applied in the high-speed reading of railway containers in livestock control. RFID is based on electromagnetic propagation. An energizing field, either electric or magnetic, is generated by a reader. The field activates a transponder attached to and associated with an object. In response, the transponder transmits an identifier code to the reader to indicate the presence of the object to which it is attached. Because of the characteristics of electromagnetic energy, there does not have to be a direct line of sight between the reader and the transponder. An in-depth discussion of RFID systems and transponders may be found on a web site maintained by Trolley Scan (Pty) Ltd. of South Africa and located at http://rapidttp.com/transponder, the entire contents and all linked web pages of which are incorporated herein by reference.

Conventional document- or file-tracking systems typically employ barcode technology. For example, a label with a barcode printed thereon is applied to the face of a document or to the outside of a file. In an office environment with a file room, the barcode is scanned by hand with a wand when a file is removed from the file room. Information is then entered into a computer to indicate who has removed the file and where the file may be located. When the file is returned, the barcode is scanned again, and information is entered again into a computer to indicate that the file has been returned.

One of the drawbacks of such a file-tracking system is that the barcode on the file needs to be scanned each and every time by hand by a file room supervisor, and information indicative of the employee who is in possession of the file needs to be entered. This is time consuming and susceptible to human error. Also, once the file leaves the file room, it is impossible to track the movement of the file throughout the office building unless the barcode is continually scanned at various points in the building. For example, there is no way to know if an employee removes the file from the building. In addition, if a large number of files needs to be removed (e.g., on a push cart), then the barcode on each file needs to be scanned, which is time consuming and labor intensive.

Long-term storage of files presents additional drawbacks to conventional barcode systems. When inactivated for long-term storage, files are often placed in boxes and moved off site to a storage facility. To locate an inactive file in long-term storage in the future requires a user to search for the correct box and then to search through the files stored in the box to locate the desired file. This process is time consuming. In addition, over time the accuracy of the location system deteriorates as files are removed and misplaced.

In view of the foregoing, there remains a need in the art for trackable files that are inexpensive to manufacture, customizable by the end user, automatically trackable over an entire site, and manageable in large numbers over an indefinite or extended period of time.

BRIEF SUMMARY OF THE INVENTION

The present invention provides trackable files and systems for monitoring and tracking such files. The files and systems of the invention are configured to utilize a radio-frequency identification (RFID) technology.

According to one aspect of the invention, a trackable file includes a body with a pair of covers and a transponder assembly disposed on the body of the file. The transponder assembly may include a substrate, an antenna disposed on one of the sides of the substrate, a circuit coupled to the antenna, and an adhesive layer disposed on the other the side of the substrate. The transponder assembly may be attached to one of the covers by the adhesive. Alternatively, the transponder assembly may be embedded in the body during fabrication of the file, thereby eliminating the adhesive layer.

According to another aspect of the invention, a system for tracking objects at a site having a plurality of locations includes a plurality of antenna arrays and a plurality of files. Each of the antenna arrays generates an energizing field and is disposed at or near one of the locations. Each of the files includes a body including a pair of covers and a transponder assembly. The transponder assembly may include a substrate, an antenna disposed on one of the sides of the substrate, a circuit coupled to the antenna and having an identifier code, and an adhesive layer disposed on the other the side of the substrate. The transponder assembly may be attached to one of the covers by the adhesive. The identifier code is unique for each of the files.

In operation, each of the transponder assemblies is activated by the energizing field of one of the antenna arrays when moved within an operative distance thereof. An activated transponder assembly responsively transmits a signal indicative of the identifier code. A reader in communication with the antenna arrays receives the signal from the activated transponder assembly. An administrator may be provided in communication with the reader for receiving information from the reader indicative of the location of the file associated with the transponder assembly transmitting the signal. Accordingly, each of the files of the system may be tracked as the files are moved throughout a site.

According to another aspect of the invention, a transponder label assembly includes a transponder assembly and a backing sheet. The transponder assembly includes a substrate, an antenna disposed on one of the sides of the substrate, a transponder circuit coupled to the antenna and having an identifier code, and an adhesive layer disposed on the other the side of the substrate. The backing sheet is releasably attached to the adhesive layer of the transponder assembly. Accordingly, a user may apply the transponder assembly to an object so that the object can be tracked.

Additional aspects, features, and advantages of the present invention will become apparent to those skilled in the art from a consideration of the following detailed description taken in conjunction with the accompanying drawings.

DETAILED DESCRIPTION OF THE INVENTION

Figure 1:
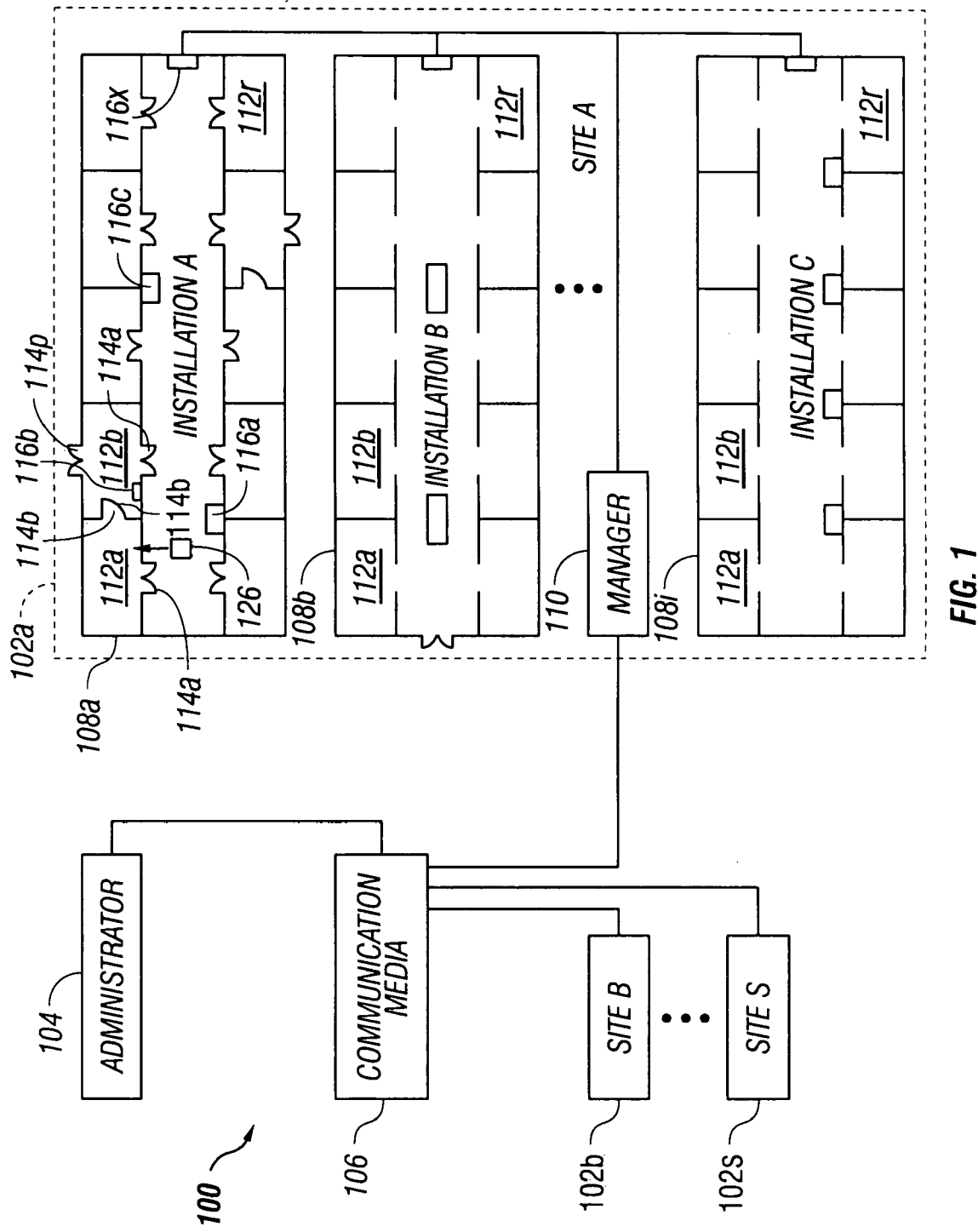
FIG. 1 is a schematic block diagram of a radio-frequency identification (RFID) object-tracking system configured in accordance with the present invention.

Referring more particularly to the drawings, a non-optical automatic-identification object-tracking system configured in accordance with the principles of the present invention is illustrated schematically in FIG. 1 and indicated by reference numeral 100. Exemplary object-tracking system 100 of the present invention is able to monitor the movement of objects (e.g., files) around a site (e.g., a courthouse building) and to maintain records of such movement so that the general—if not the exact—location of objects is known or may be determined in a relatively short amount of time and with relatively little effort. Accordingly, if personnel (e.g., a docket clerk) need to physically locate an object, then the system 100 may be referenced to access information indicative of the present location of a desired object. Details of exemplary physical embodiments and methodology of the present invention are described below.

Exemplary system 100 of the invention includes one or more sites 102a, 102b, . . . , 102s connected to an administrator 104 through a communication medium or media 106. Each of the sites 102 may include one or more installations 108a, 108b, . . . , 108i connected to a site manager 110, which, in turn, is in communication with the administrator 104 via media 106. Each of the installations 108 is disposed in connection with one or more rooms 112a, 112b, . . . , 112r each accessible by one or more portals 114a, 114b, . . . , 114p.

Figure 2:
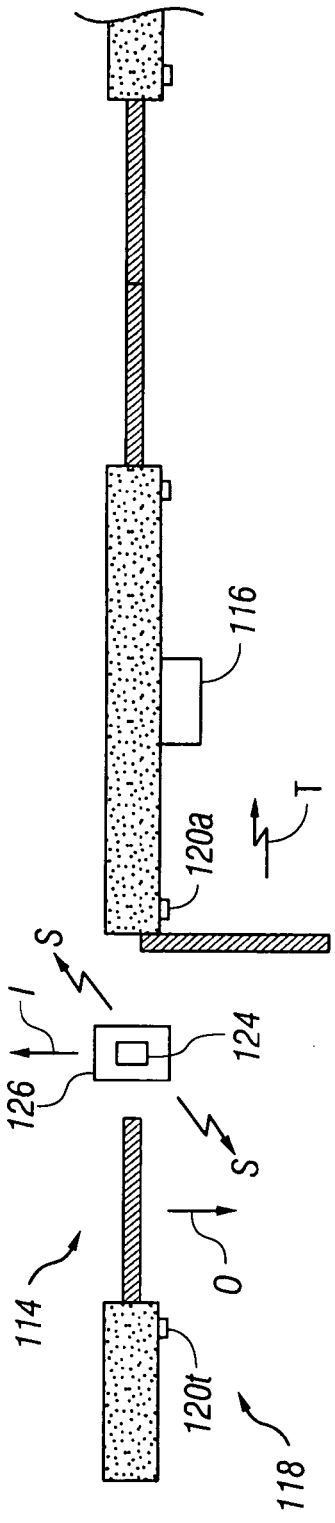
FIG. 2 is a schematic plan view of antenna arrays and a reader disposed in relation to portals in accordance with the present invention.
Figure 3:
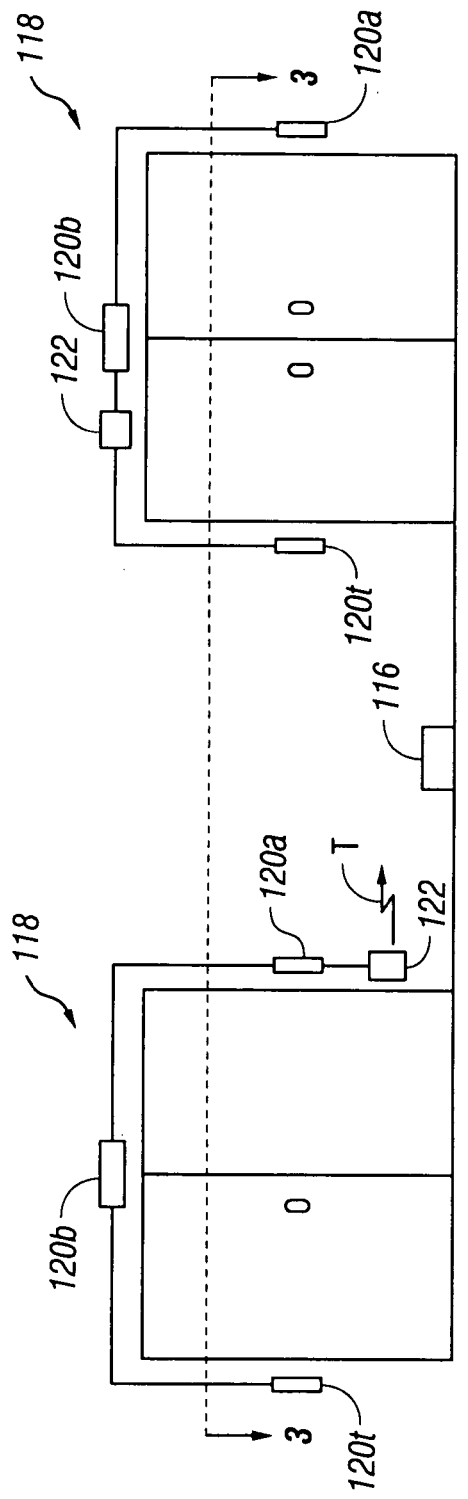
FIG. 3 is a cross-sectional view along line 3—3 of FIG. 2.

With additional reference to FIGS. 2 and 3, each of the installations 108 includes at least one reader 116 in communication with at least one antenna array 118 disposed at or near one of the portals 114. Each antenna array 118 may include one or more antennae 120a, 120b, . . . , 120t connected to a controller 122. The antennae 120 are tuned to receive a signal S transmitted by a transponder 124 disposed on an object 126 such as a file folder as shown in FIG. 3. The signal S, which is a radio-frequency (RF) signal (i.e., not requiring a line of sight), carries an identifier code unique to the object 126 with which the transponder 124 is associated. In a passive embodiment of the invention, the antennae 120 propagate energy from the controller 122 to generate an electric field which energizes or activates the transponder 124 to transmit the signal S when the object 126 is within the range of the array. Upon receipt of the signal S, the antenna array 118 transmits a signal T to the reader 116. As shown in FIG. 1, each of the readers 116 is in communication with the site manager 110 and transmits information to the manager when a signal T is received. The communication media 106, as well as the media interconnecting the reader 116, the antennae 120, the controller 122, may be either hardwired or wireless, or any combination thereof, as desired.

The term "portal" is used herein to describe not only a traditional doorway as shown in FIGS. 2 and 3 but also areas and spaces through which objects may customarily pass. For example, windows, cubicle entrances, stairways, area dividers, book cases, and so on may all be thought of as portals. Accordingly, in a more general sense, the term "portal" is used herein to indicate the area within an operative distance of an antenna array 118.

In operation, when the object 126 passes through the portal 114, the signal S from the transponder 124 is received by the antenna array 118, which, in turn, transmits a signal T to the reader 116. The reader 116 then relays information to the manager 110 indicating that a particular object 126 with a unique identifier code has passed through a particular portal 114 in a particular direction (either in, as indicated by arrow I, or out, as indicated by arrow O, in FIG. 3). The manager 110, which may include a computer with memory, maintains a record that the particular object 126 has passed through a particular portal 114 and is now present in a particular room 112 in a particular installation 108. The manager 110 may then transmit information indicative of the same to the administrator 104. The administrator 104, which, like the manager, may include a computer with memory, may also maintain a record of the location of the object 126.

Accordingly, exemplary system 100 of the present invention is configured to monitor the movement of objects and to maintain records of such movement so that the location of any number of objects is always known and accessible. For example, with reference to FIG. 1, if an object 126 is transported in through portal 114a of room 112a of installation A 108a of site A 102a, then the manager 110 (or administrator 104) records that the object 126 is presently in that particular room. If the same object 126 then passes through portal 114*b* of room 112*a* and into room 112*b*, then the antenna array (not shown in FIG. 1) receives a signal S from the transponder 124 disposed on the object and transmits a signal T to the nearest reader 114*b*. Reader 114*b* then relays information to the site manager 110 indicative of the present location of the object 126, i.e., in room 112*b*. The site manager 110 then maintains a record of such movement.

Figure 4:
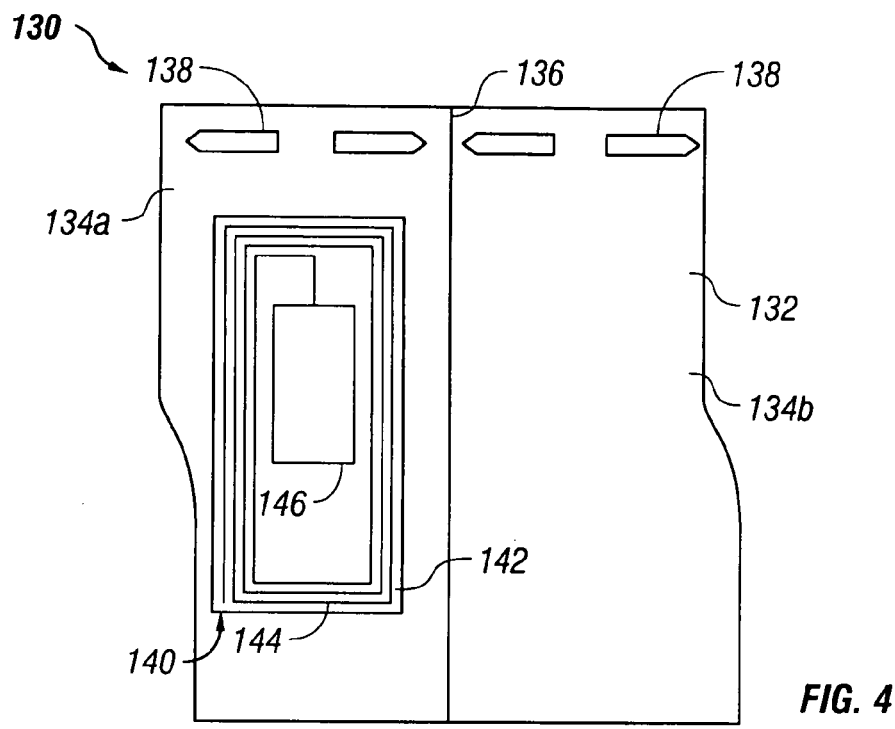
FIG. 4 is a schematic view of a trackable file shown according to an exemplary embodiment of the invention.

In accordance with one exemplary embodiment of the invention, the object 126 is a file for holding paper, an example of which is illustrated in FIG. 4 and indicated by reference numeral 130. Exemplary file 130 includes a body 132 which has a pair of covers, for example, a front cover 134*a* and a back cover 134*b*, which are pivotal with respect to each other along a fold line 136. The file 130 may include any type of known binding means to retain documents therein, such as prongs 136, although the file may be configured with other types of document retainers, such as sheet protectors, ring binders, and so on. In addition, the file 130 may be configured as a tri-fold file, an accordion file, an expanding file, etc. In accordance with the present invention, exemplary folder 130 includes a transponder assembly 140 attached thereto.

Figure 5:
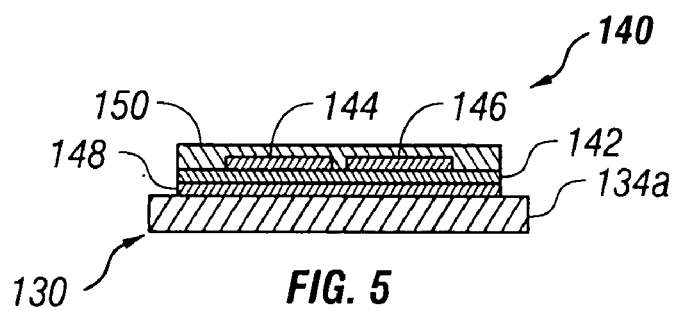
FIG. 5 is an enlarged fragmentary cross-sectional view of the trackable file of FIG. 4.

With additional reference to FIG. 5, exemplary transponder assembly 140 includes a substrate 142. An antenna 144 coupled to a transponder circuit 146 is disposed on one side of the substrate 142, and a layer of adhesive 148 is disposed on the other side of the substrate 142 for affixing the assembly 140 to the file 130. For example, the transponder assembly 140 may be positioned and adhered on an inside face of the front cover 134*a*. The transponder circuit 146 includes an identifier code unique to the file to which it is attached. A top coat 150 may be applied to protect the antenna 144 and the circuit 146 from damage. Alternatively, a lamination sheet may be applied over the transponder circuit 146 to maintain integrity thereof. Exemplary transponder assembly 140 may be attached to one of the covers 134 during manufacture or after purchase by an end user. According to the latter, the transponder assembly 140 may comprise an adhesive label including a backing sheet (not shown) with a release layer applied to the adhesive 148 which may be removed by the user prior to adhering the assembly to a file, which will be discussed in more detail below.

In addition to the unique code assigned to the object 126 by the transponder assembly 140, the transponder circuit 146 may be encrypted to create an electronic signature. Encrypted electronic signatures may be used, for example, to authenticate or substantiate a chain of custody of an object 146, and to deter forgeries. The chain of custody may then be maintained in a database, which will be discussed in more detail below.

Figure 6:
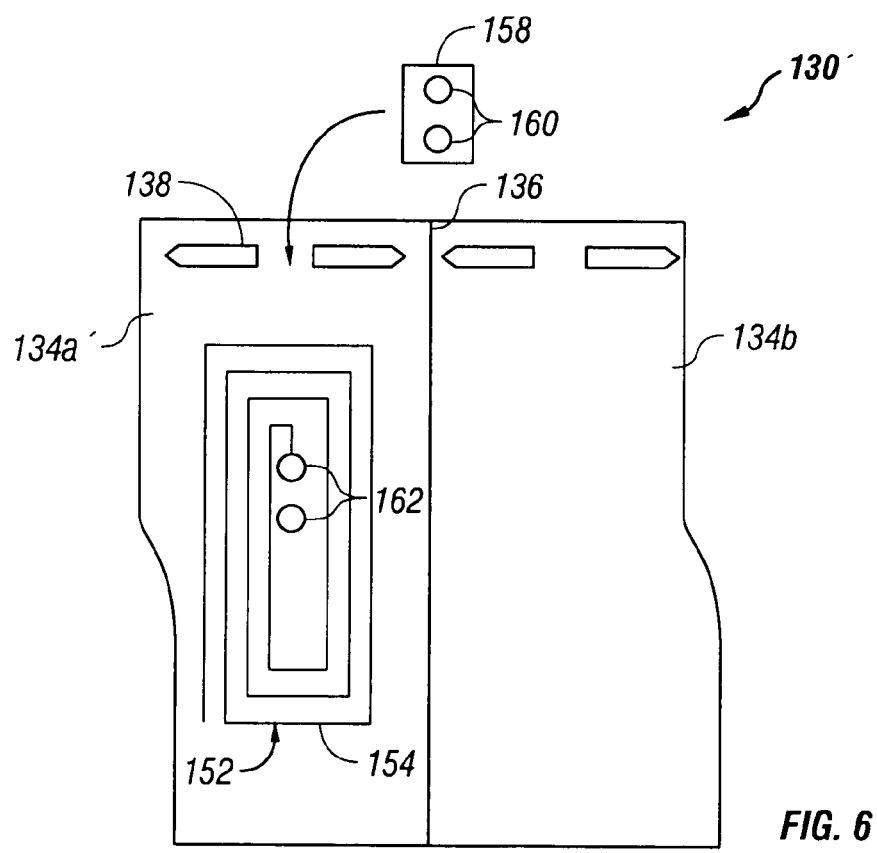
FIG. 6 is a schematic view of a trackable file shown according to another exemplary embodiment of the invention.
Figure 7:
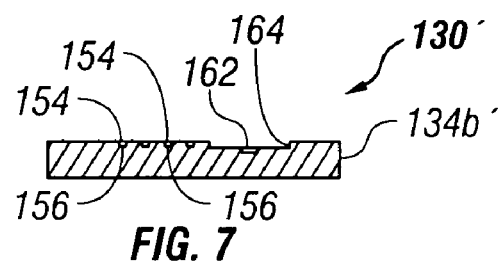
FIG. 7 is an enlarged fragmentary cross-sectional view of the trackable file of FIG. 6.

An alternative embodiment of a file of the invention is shown in FIGS. 6 and 7. Rather than including a transponder assembly configured as a label as described above, exemplary file 130' includes an integral transponder assembly 152 which is incorporated into the file during manufacture. Exemplary assembly 152 includes an antenna 154 embedded within one of the covers, e.g., the front cover 134*a*'. The cover 134' may include channels 156 for accommodating the antenna 154.

The antenna 154 may be coupled directed to a transponder circuit during manufacture analogous to that described above. Alternatively, the transponder assembly 152 may include a separate transponder circuit 158 with contacts 160 for coupling with contacts 162 disposed on the file 130', one of which is connected to the antenna 154. The file 130' may include a recess 164 configured to receive the circuit 158 when coupled with the contacts 162. According to the embodiment of the invention illustrated in FIG. 6, the file 130' may be generically produced with the embedded antenna 154. The end user may then acquire separate transponder circuits 158 configured to couple with the contacts 162.

Figure 8:
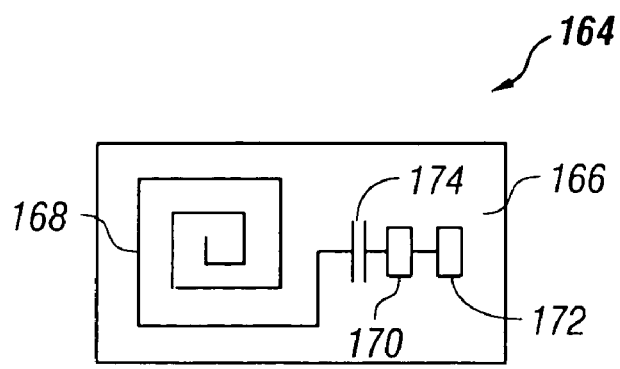
FIG. 8 is a schematic view of an active RFID label according to an exemplary embodiment of the present invention.

Both of the transponder assemblies 140 and 152 are configured as passive transponders, that is, the assemblies do not include a power supply. The power required to activate the transponder circuits 146 and 158 is provided by the electric field generated by the antenna array 118. However, the present invention also provides active transponder assemblies, an example of which is shown in FIG. 8. Exemplary active transponder assembly 164 includes a substrate 166 on which an antenna 168 coupled to a transponder circuit 170 is disposed. A battery 172 is connected to the circuit 170 to provide power. A capacitor 174 may be provided to tune the assembly. Analogous to the embodiment shown in FIGS. 4 and 5, exemplary active assembly 164 may be configured as a label with adhesive and a backing sheet for application to a file. The battery 172, which may be rechargeable or non-rechargeable as desired, may be configured in accordance with advanced conventional battery technology, including paper-based and thin-film batteries.

In addition to sending a signal S, the active transponder assembly 164 may be configured to receive a signal from the antenna assembly 118. More specifically, with on-board power from the battery 172, the information carried by the transponder circuit 170 may be varied along the route the file takes through a site 102. Accordingly, the circuit 170 may include memory and logic for retaining memory when not in the presence of the electric field generated by an antenna array 118. The memory may be powered by the battery 172 or, alternatively, may be magnetic based that is able maintain data when not powered. In addition to memory, the active circuit 170 may also include a receiver, a crystal clock, and a microprocessor depending upon the design requirements of a particular application.

Depending upon the strength of the antenna array 118, exemplary transponder assemblies 140 and 152 may range from about 3 inches in width and about 5 inches in height to about 7 inches in width to about 10 inches in height. This size of the array 118 conforms to conventional file sizes for use with letter-size (i.e., 8½ by 11 inches or A4) and legal-size (i.e., 8½ by 14 inches) paper. The label assembly 140 may include removable-type pressure-sensitive adhesive so as to be removable and reusable, which is particularly useful if file is to be placed in long-term inactive storage. In addition to file folders, the transponder assemblies 140 and 152 may be applied to or integrated with any number of stationery products associated with files, such as file dividers, binders, tab dividers, index tabs, color-coded tracking labels, file pockets, sheet protectors, file storage boxes, and so on. The transponder assemblies 140 and 152 may also be integrated into a variety of documents or document carriers, such as shipping manifests, invoices, shipping labels, and so on.

Figure 9:
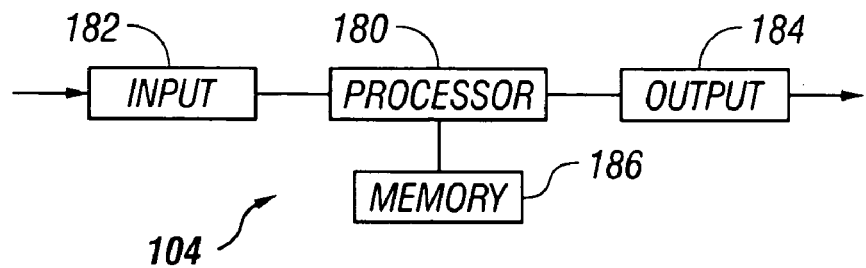
FIG. 9 is a schematic block diagram illustrating an exemplary administrator configured to track files in accordance with the present invention.

An exemplary embodiment of the administrator 104 is illustrated in FIG. 9 and may include a processor 180 connected between an input 182 and an output 184 and coupled to a memory device 186. The input 182 and the output 184 may be configured to couple with and respectively receive and transmit appropriate signals on any type of communication medium known in the art. Upon receiving information from the readers 116, the processor 180 updates a database in the memory 186 of the movement of the objects 126. A user may then access the administrator 104, which may be desktop computer, according to conventional means. Such access of information is typically remote from the actual location of the object in question.

Figure 10:
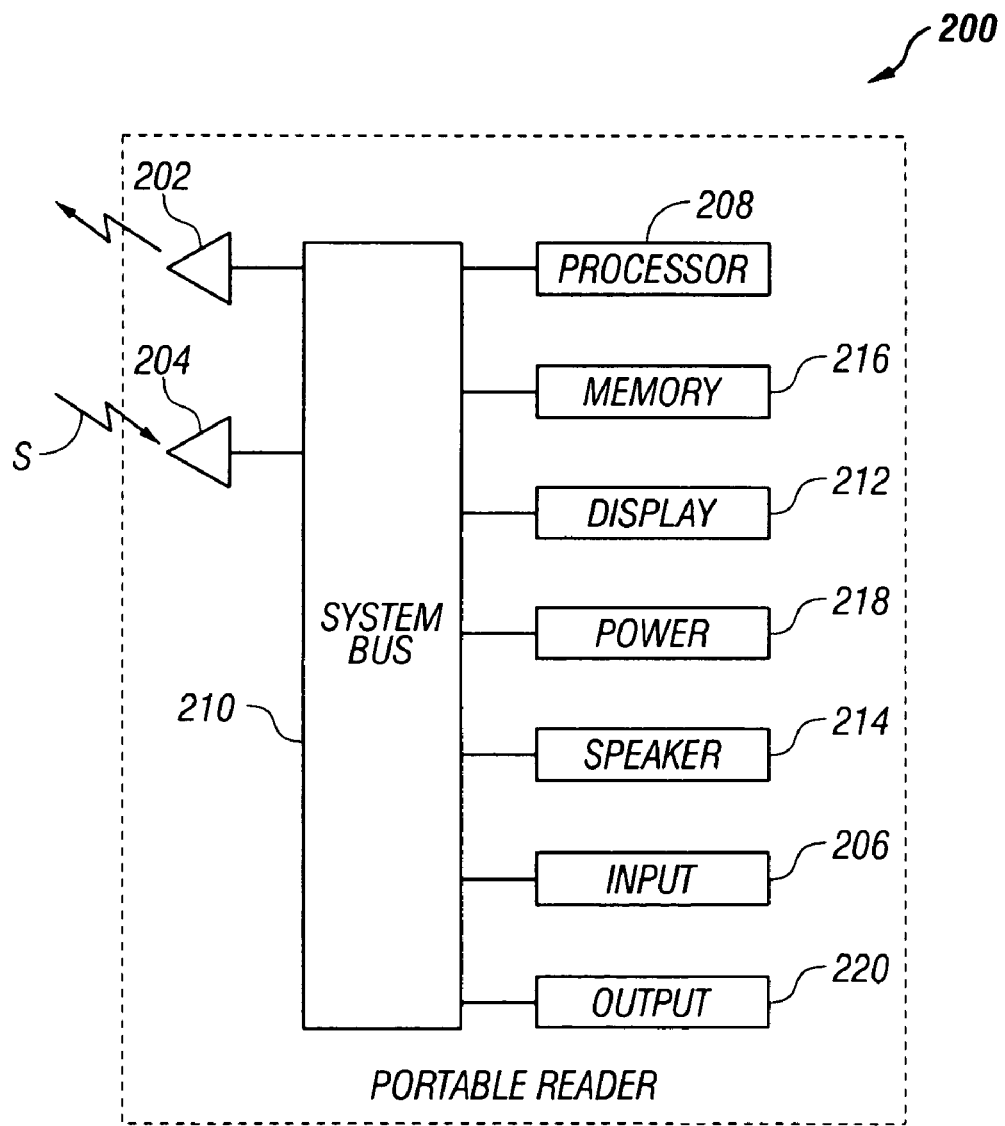
FIG. 10 is a schematic block diagram of a portable reader configured according to the principles of the present invention.

With reference to FIG. 10, in addition to placing the physical location of an object within a given room, the system 100 according to a preferred embodiment is also capable of locating the object within a particular room by using a portable reader 200. Exemplary portable reader 200 is particularly beneficial in situations where a large number of objects such as files 130 (which look the same) are located in the same room 112. In this case, a user knows that the file 130 is in the particular room but would need to visually look at every file until the desired file is found. This can be time consuming. Accordingly, exemplary reader 200 is configured to be hand held so that a user may carry the reader into a room and locate a desired file.

More specifically, exemplary portable reader 200 includes a transmit antenna 202 and a receive antenna 204. A user may enter information regarding the desired file, e.g., the identifier code, in question into the reader with an input 206, e.g., a keypad. The transmit antenna 202 then generates an energizing field which activates the transponder assemblies 140 within range. Each of the transponder assemblies 140 activated by the transmit antenna 202 responsively transmit a signal S which is received by the receive antenna 204. A processor 208 receives the signals S via a system bus 210 and provides a signal to an output device, either a display 212 or a speaker 214, when a signal S is received from the transponder assembly associated with the desired file 130.

Accordingly, a user may move about a room with the portable reader 200 in hand until informed, either by a visual signal on the display 212 or by an audio signal from the speaker 214, that the file in question is near. The signals may indicate the proximity of the file in question. Exemplary portable reader 200 may also include memory 216 and a power supply 218. An output 220 may also be provided to communicate location information to the site manager 110 or to the administrator 104.

The portable reader 200 may also be configured to query the administrator 104 or the site manager 110, preferably wirelessly, of the location of a file 130. If the file 130 is in a file room, then the user may place an order for the file with the portable reader 200 to have the file sent to a desired location. The output 220 of the portable reader 200 may be configured to communicate with any number of current communication technologies, such as the Internet, "Blue Tooth" wireless, wireless cellular, etc.

Figure 11:
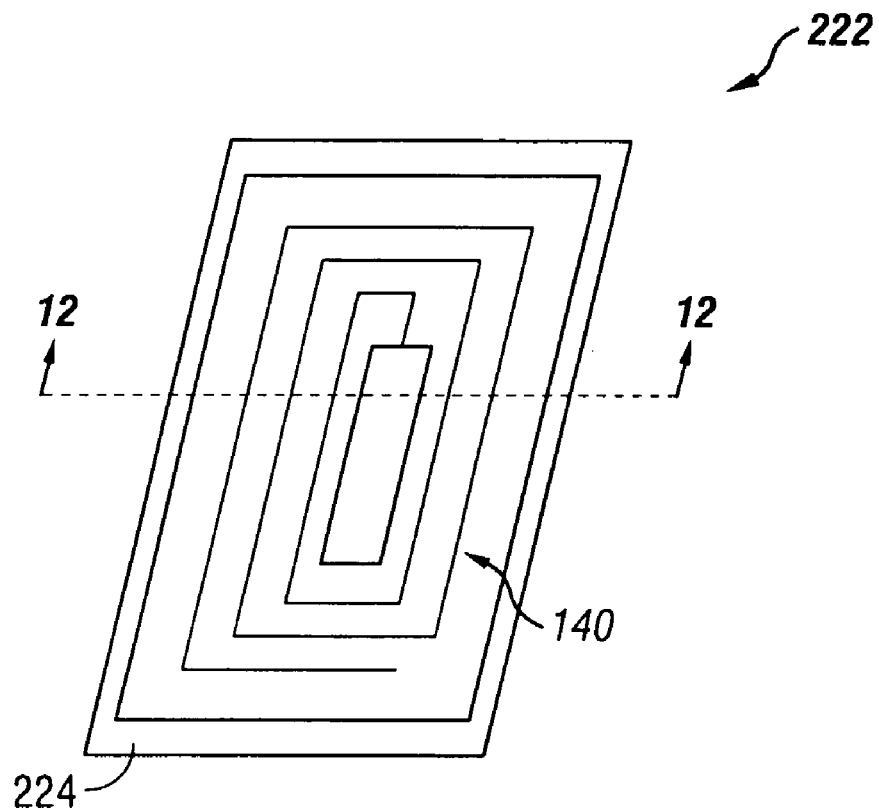
FIG. 11 is a perspective view of a transponder label assembly configured in accordance with the present invention.
Figure 12:
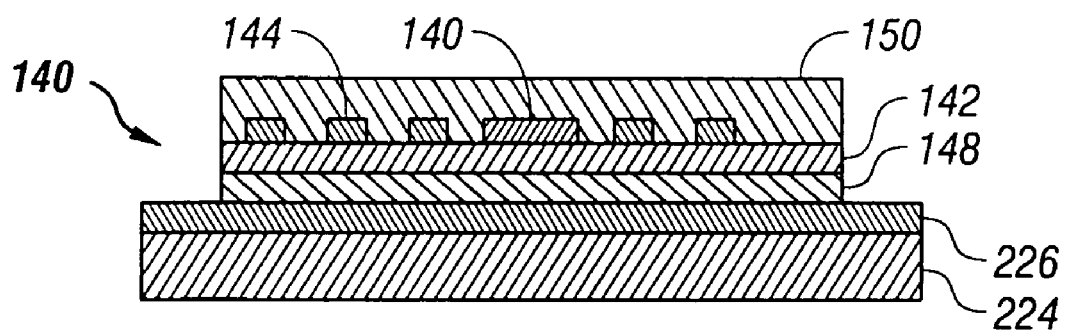
FIG. 12 is an enlarged cross-sectional view of a transponder label assembly taken along line 12—12 of FIG. 11.

As mentioned above, exemplary transponder assembly 140 may be configured as a label. Accordingly, referencing FIGS. 11 and 12, a transponder label assembly 222 of the present invention includes a transponder assembly 140 mounted on a backing sheet 224 with a release layer 226. Analogous to the description above in relation to FIG. 5, the transponder assembly 140 is disposed on a substrate 142 with an adhesive layer 148. Accordingly, a user may employ the transponder label assembly 222 in retrofitting objects for tracking by peeling the transponder assembly 140 off of the backing sheet 224 for adhering to an object.

Figure 13:
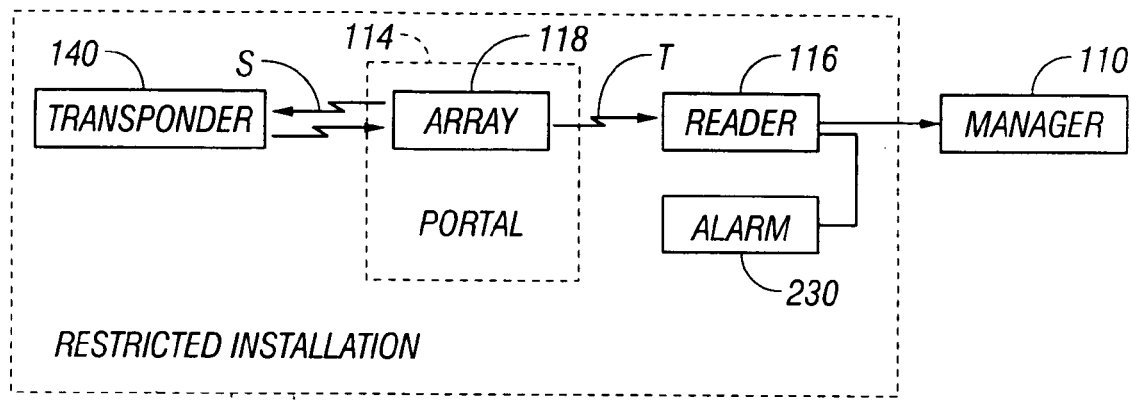
FIG. 13 is a block diagram of an object tracking system of the invention, particularly illustrating a system with an alarm for security in restricted installations.

According to a preferred embodiment, one or more of the installations 108 may be defined as a restricted area. For example, objects located in an installation so designated may be restricted to that particular installation and prohibited from being taken off the premises. To enhance the security of such an embodiment, referencing FIG. 13, each of the portals 114 in a restricted installation 108 may include an alarm system 230. Accordingly, if an object passes through a portal 114 out of (or into) a restricted installation 108, the reader 116 or the manager 110 may trigger the alarm 230 to sound. The alarm may include audio and visual signals.

Figure 14:
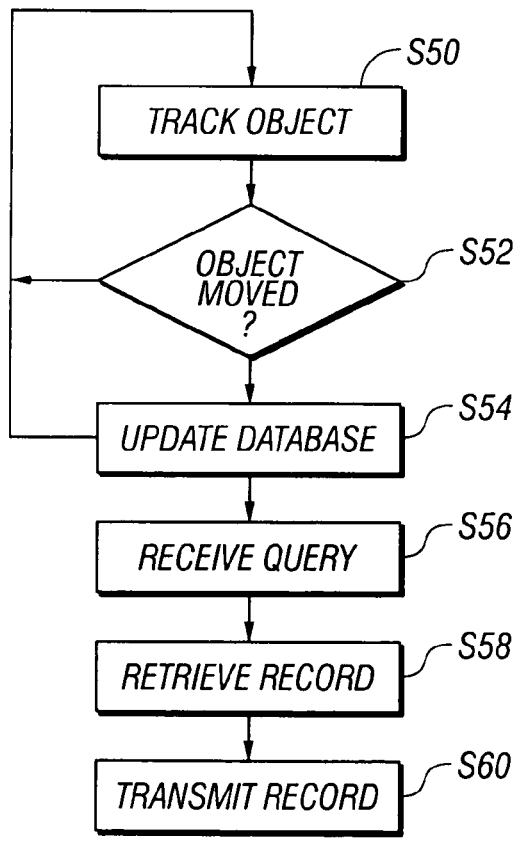
FIG. 14 is a flow chart illustrating exemplary object-tracking methodology of the invention.
Figure 15:
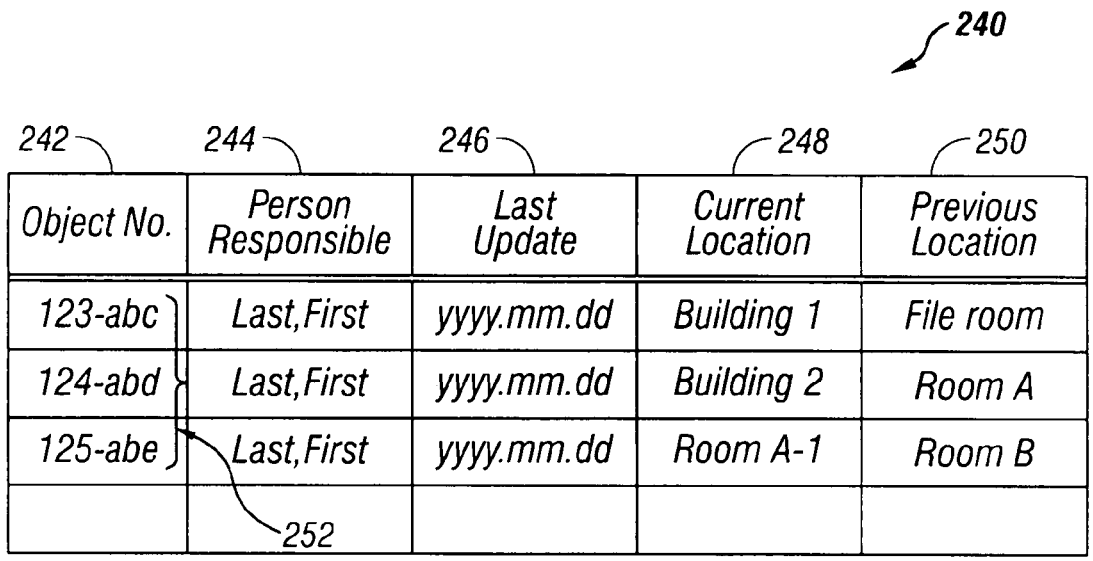
FIG. 15 is a table illustrating a representative database output configured in accordance with the invention.

Exemplary methodology of the present invention is illustrated in FIG. 14. As mentioned above, exemplary system 100 is configured to track objects 126 (step S50) and if an object 126 is moved through a portal 114 with an antenna array 118 (step S52), a database stored in memory (e.g., memory 186 of the administrator 104) is updated indicating the same (step S54). An exemplary database output according to the invention is illustrated in FIG. 15 and indicated by reference 240. The database may include fields for the unique object number 242, a person responsible for the object 244, a date of the last update 246, the current location of the object 248, and the previous location of the object 250. The administrator 104 of the manager 110 may then be queried (step S56). A record 252 including data from one or more of the fields 242–250 may then be retrieved (step S58) and transmitted (step S60) to the querying party.

Figure 16:
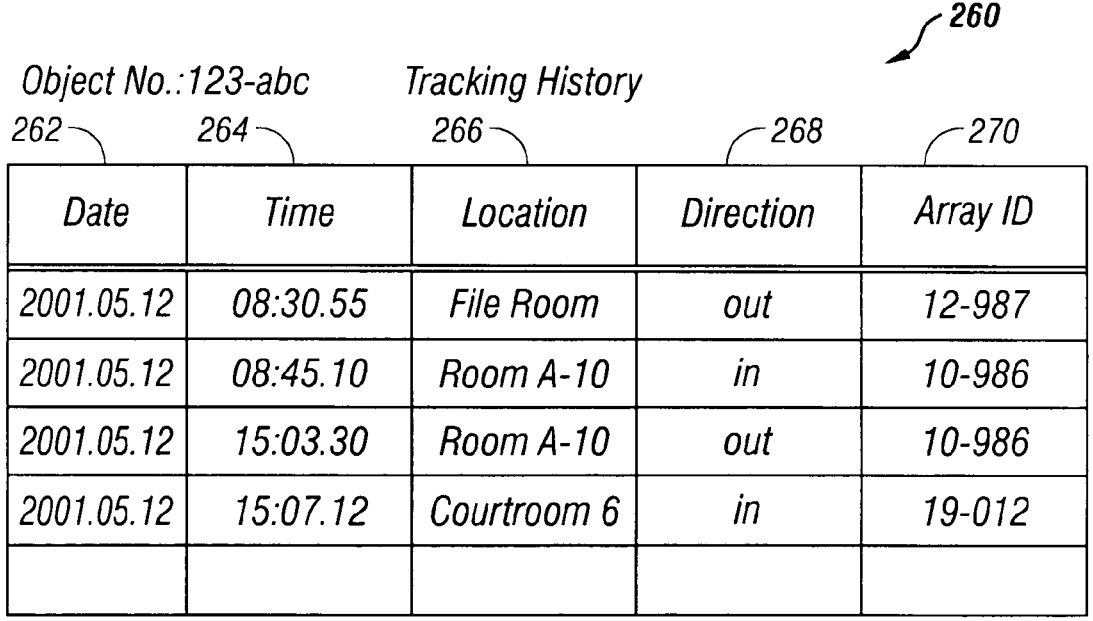
FIG. 16 is a table illustrating an alternative database output of the invention, particularly an output for tracking the history of an object.

As shown in FIG. 16, the database may be caused to generate a "genealogy" or tracking history output 260 of a particular object 126. Exemplary database output 260 may include information and data indicative of a "chain of custody" and movement of a particular object. For example, fields directed to date 262, time 264, location 266, direction, 268, and array identification number 270, as well as responsible person 244 (shown in output 240), may be included in the database output 260. Accordingly, database output 260 provides a trace of all the locations at which an object 126 has been located over time, or all the persons who have had custody over time. Genealogy information may be used in applications for routing history or locating documents relating to a given topic or subject. Thus the system might be able to locate documents or files of interest to a given user, based on the database design. For example, sensitive documents such as medical documents in emergency rooms or X-rays may be accurately traced if desired. Regarding array ID 270, each of the antenna arrays 118 may include a unique ID included in signal T so that specific tracking information may be obtained.

Figure 17:
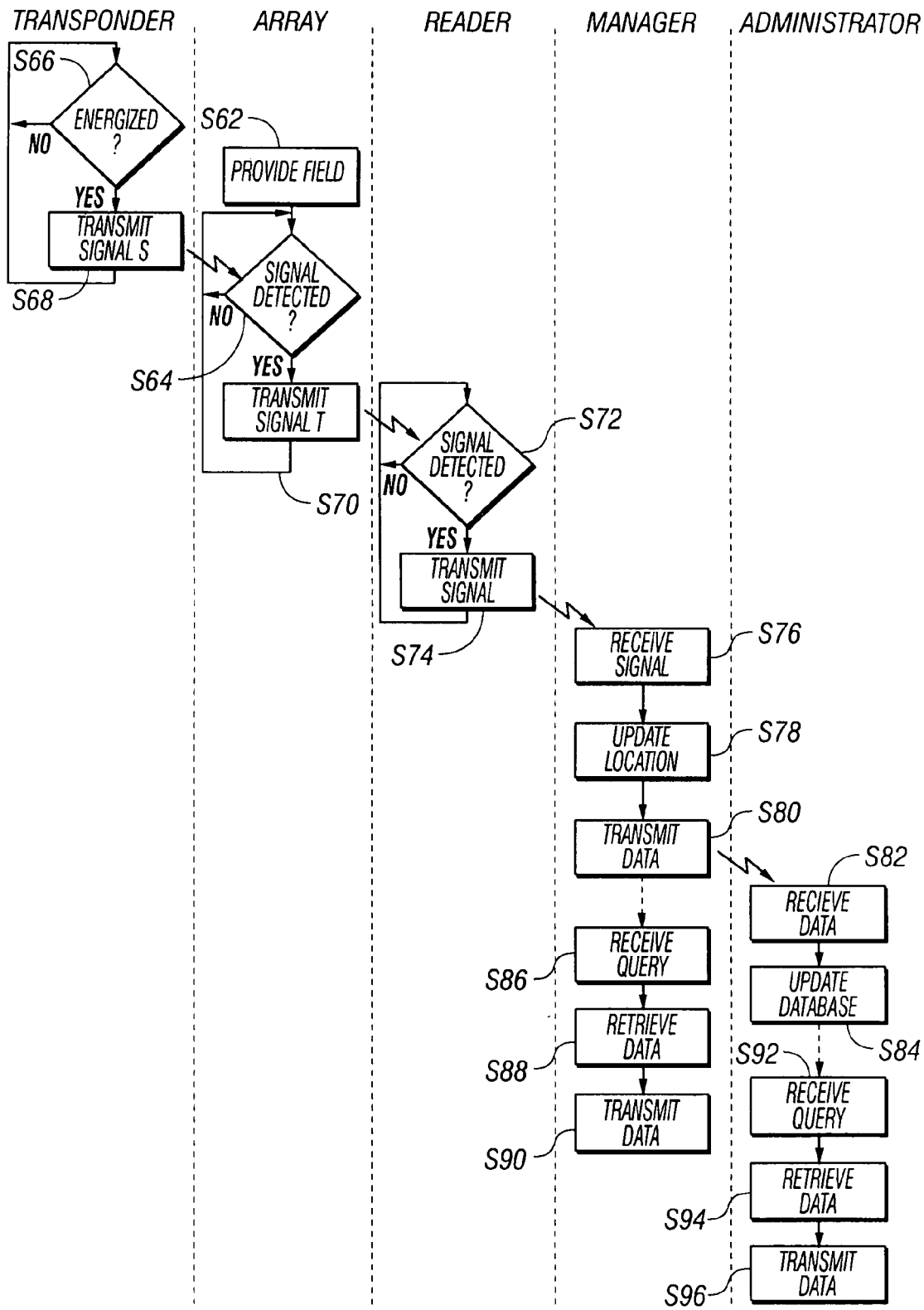
FIG. 17 is a flow chart illustrating in detail methodology for tracking object in accordance with a passive embodiment of the invention.

With reference to FIG. 17, exemplary methodology incorporating representative elements of the tracking system 100 of the invention is illustrated. As described above, in a passive embodiment, each array 118 generates and provides an energizing field (step S62) and waits until a signal from a transponder assembly 140 is detected (step S64). Complementarily, when the transponder assembly 140 is energized by an antenna array 118 (step S66), a signal S is transmitted (step S68). Upon detecting the signal S (step S64), the antenna array 118 transmit a signal T to a reader 116 (step S70). Upon detecting the signal T (step S72), the reader 116 transmits a signal to the manager 110 (step S74).

Upon receiving the signal from the reader 116 (step S76), the manager 110 may update the location of the object 126 in the database (step S78). As an alternative or in addition to, the manager 110 may then transmit data indicative of the movement of the object 126 (step S80) to the administrator 104. Upon receipt (step S82), the administrator 104 may then update the database as well (step 84). The manager 110 may then be queried (step S86) regarding a particular object 126, thereafter retrieving (step S88) and providing (step S90) data specific to the object to the querying party. In addition, the administrator 104 may be queried (step S92) regarding a particular object 126, thereafter retrieving (step S94) and providing (step S96) data specific to the object to the querying party. The data provided to the querying party may be in the form of the database outputs 240 and 260 shown in FIGS. 15 and 16.

The system 100 of the present invention may be configured to satisfy the needs of any type of installation and load. For example, the system 100 may be configured to read a large number of transponder assemblies 140 and 152. In this regard, the entire disclosure of U.S. Pat. No. 5,726,630 entitled "Detection of Multiple Articles" is incorporated herein by reference. In this regard, the entire disclosure of each of the following United States patents are also incorporated herein by reference: U.S. Pat. No. 5,699,066 entitled "Synchronized Electronic Identification System" and U.S. Pat. No. 5,995,107 entitled "Electronic Identification System Confirming Valid Code."

The transponder assembly 140 of the invention may be fabricated according to technology known as "nanoblock" technology, which enables RFID devices to be assembled in a fluid, self-assembly process way of embedding one or more circuit devices (i.e., "nanoblocks") in an RFID substrate 142. In this regard, Alien Technology Corporation of Morgan Hills, Calif., has developed significant techniques for manufacturing microelectronic elements or nanoblocks. The nanoblocks are deposited on the substrate 142 at precisely determined locations using a technique known as fluidic self-assembly, or FSA. In particular, Alien Technology fabrication methodology includes forming nanoblocks, forming a substrate with recesses complementary in shape to the nanoblocks, and then transferring the nanoblocks via a fluid or slurry onto a top surface of the substrate 142 having the recessed regions (or binding sites or receptors). Upon transference, the nanoblocks self-align through shape into the recessed regions and integrate thereon.

The compositions and the various processing techniques used to produce the nanoblocks, the underlying substrates, and subsequent processing operations are disclosed in a number of patents owned by or licensed to Alien Technology, including U.S. Pat. Nos. 5,783,856; 5,824,186; 5,904,545; and 5,545,291, as well as published international applications filed under the Patent Cooperation Treaty (PCT), including WO 00/49421, WO 00/49658, WO 00/55915, and WO 00/55916, the entire disclosure of each patent and published application is incorporated herein by reference. A recent publication about the Alien processing technique may be found in the journal SOCIETY FOR INFORMATION DISPLAY, Vol. 16, No. 11, at pages 12–17.

Those skilled in the art will understand that the preceding exemplary embodiments of the present invention provide the foundation for numerous alternatives and modifications thereto. These and other modifications are also within the scope of the present invention. Accordingly, the present invention is not limited to that precisely as shown and described above but by the scope of the appended claims.

What is claimed is:

1. A file for use in a radio-frequency identification (RFID) system, the file comprising:
    a body including a pair of covers;
    a transponder assembly including:
        an antenna embedded on one of the covers; and
        a circuit coupled to the antenna and having an identifier code;
    one of the covers including a channel for accommodating the antenna;
    a pair of contacts one of which is connected to the antenna; and
    wherein the circuit includes a pair of contacts for coupling with the pair of contacts of the file, the circuit being a separate circuit for coupling with the pair of contacts of the file by an end user.

2. The file of claim 1 wherein one of the covers includes a recess configured to receive the circuit.

3. A system for tracking objects at a site having a plurality of locations, the system comprising:
    a plurality of antenna arrays each for generating an energizing field, each of the antenna arrays being disposed at or near one of the locations;
    a plurality of files each including:
        a body including a pair of covers; and
        a transponder assembly including:
            an antenna embedded on one of the covers;
            a circuit coupled to the antenna and having an identifier code;
            one of the covers including a channel for accommodating the antenna;
            a pair of contacts one of which is connected to the antenna; and
            wherein the circuit includes a pair of contacts for coupling with the pair of contacts of the file, the circuit being a separate circuit for coupling with the pair of contacts of the file by an end user
    each of the transponder assemblies being activated by the energizing field and responsively transmitting a signal indicative of the identifier code;
    a reader in communication with the antenna arrays for receiving the signal when one of transponder assemblies is activated by one of the antenna arrays; and
    an administrator in communication with the reader for receiving information from the reader indicative of the location of the file associated with the transponder assembly transmitting the signal.

4. A file for use with a radio-frequency identification (RFID) transponder circuit with a pair of contacts, the file comprising:
    a body including a channel and a recess;
    an antenna received in the channel; and
    a pair of contacts one of which being connected to the antenna;
    wherein the transponder circuit is coupleable with the pair of contacts of the file when the circuit is placed in the recess by an end user.

5. The file of claim 4 wherein the pair of contacts of the file are disposed in the recess.

* * * * *